UNITED STATES PATENT OFFICE.

ALFRED PARAF, OF NEW YORK, N. Y., ASSIGNOR TO EDWARD SABINE RENWICK, TRUSTEE, OF SAME PLACE.

IMPROVEMENT IN COMPOSITIONS OF MADDER FOR PRINTING CLOTHS, &c.

Specification forming part of Letters Patent No. 113,919, dated April 18, 1871.

*To all whom it may concern:*

Be it known that I, ALFRED PARAF, of France, now residing in the city, county, and State of New York, have made an invention or discovery of a new and useful article of manufacture or composition of matter, which I denominate "Rubidide;" and that the following is a full, clear, and exact description of the same.

Rubidide is a chemical substance produced by the action of the coloring-matter of madder upon glycerine, and, when not thinned by the addition of a liquid, is a dark-colored viscous material having the consistency of molasses. It is a very valuable material for the purpose of printing madder colors upon cloths, one of its distinctive characteristics being that it is a fixed compound, which is not volatilized by the heat to which printed textile articles are subjected for the purpose of fixing the colors; whereas the extracts of madder are volatile, and consequently, when they are used for printing, a large portion of the coloring principle is dissipated by heat.

The new material may be prepared from any extract of madder which will act upon glycerine—such, for example, as the extract of madder obtained by the action of alcohol or a hydrocarbon upon flour of madder, or upon garancine, or the extract denominated "tinctorine."

If the extract of madder obtained by means of schiste-oil or petroleum be employed for the purpose of manufacturing rubidide, the latter may be prepared as follows: Mix together equal weights of pure glycerine and of the moist extract. Boil the mixture for not less than ten minutes, or longer if the extract be not all dissolved in that time, and stir continually during the boiling. The effect of these operations is to produce what appears to be a chemical combination of the glycerine as a base with colored acids of the madder-plant; and the article produced, which I have denominated "rubidide," is believed by me to be a mixture of the alizaric and purpuric ethers of glycerine.

The extract, instead of being used in a moist state, may be dried before use. In this case it is expedient to use equal weights of the dry extract and of glycerine, and to boil the mixture, as before.

In place of using the extract of madder above mentioned, an equal quantity of the extract called "tinctorine" may be treated in the same way for the purpose of producing rubidide. The article thus produced is not restricted by the process employed in producing it, nor by the peculiar characteristics of the extract of madder that is employed for the purpose; nor is it limited, so far as I know, by the proportions in which the materials are used, because if there be too much glycerine a portion of the extract of madder will not be acted upon, and merely a less quantity of rubidide will be produced, while if there be an excess of glycerine, it merely thins the article by solution.

I claim as my invention and desire to secure by Letters Patent—

The new article of manufacture denominated "rubidide," and hereinbefore described.

In witness whereof I have hereto set my hand this 10th day of September, 1869.

ALFRED PARAF.

Witnesses:
GEO. H. COLLINS,
E. S. RENWICK.